June 5, 1956 H. H. KERR ET AL 2,748,827
PNEUMATIC TIRE
Filed March 10, 1953 2 Sheets-Sheet 1

INVENTORS
HENRY H. KERR
ARTHUR E. BENSON
STEWART P. BOWER
LEO E. SIESS
BY Irwin M. Lewis
ATTORNEY.

INVENTORS
HENRY H. KERR
ARTHUR E. BENSON
STEWART P. BOWER
LEO E. SIESS
BY Irwin M. Lewis
ATTORNEY.

United States Patent Office 2,748,827
Patented June 5, 1956

2,748,827

PNEUMATIC TIRE

Henry H. Kerr, Detroit, and Arthur E. Benson, Grosse Pointe Farms, Mich., Stewart P. Bower, Wheaton, Md., and Leo E. Siess, Huntington Woods, Mich., assignors to United States Rubber Company, New York, N. Y., a corporation of New Jersey Application March 10, 1953, Serial No. 341,472

4 Claims. (Cl. 152—341)

This invention relates to a pneumatic tire for use either as the track for track laying vehicles or as a wheel tire. More particularly, the invention relates to improvements in pneumatic tires of the type incorporating a plurality of longitudinally extending, endless, flexible, inflatable tubes positioned in side by side parallel relationship so as to provide a tire having comparably wide flat tread and a comparably small cross sectional height.

The tire of the present invention differs from tires of this type heretofore proposed in the cross sectional shape of the inflatable tubes forming the tubular air chambers. In the present invention, these tubes are of an oblong shape in cross section with the height thereof substantially greater than the width. It has been found that the use of this particular shape for the tubes combined with the use of reinforcing cords around the individual tubes and around the tubes as a group results in a tire which will give exceptional service life and riding qualities.

The increased service life is due to the fact that when the tubes are inflated, the greatest forces are exerted in a transverse direction with respect to the tire as the greatest area on which the pressure acts is in the sidewalls of the tubes rather than the end walls. As the tubes as a group are restrained against transverse expansion by the reinforcing cords surrounding the group, the reaction forces exerted in a transverse direction press the sidewalls of the adjacent tubes tightly together thereby increasing the effective bond between the individual tubes and the reinforcing cords surrounding the individual tubes. When interconnecting grommets are provided between two or more of the tubes to permit inflation of two or more tubes from valves, the reaction forces exerted between the tubes from the restraining action of the cords wrapping the group, places the grommets under compression thereby increasing the effective bond between the grommets and the tubes. Because of the oblong shape of the tubes, they occupy substantially all the space within the substantially rectangular cover of the tire so that very little solid filler material need be used between the cover and tubes and heat build up and power consumption are thereby reduced.

The riding quality of the tire is enhanced by the fact that the reinforcing cords surrounding the tubes as a group take a large part of the force due to inflation with the result that comparatively light reinforcing cords and a small number of plies of reinforcing cords may be used around the individual tubes. As the cushioning quality of the tire is largely dependent on the flexibility of the partitions separating adjacent air chambers and as the separating partitions are formed by the sidewalls of the tubes and the reinforcing cords surrounding the individual tubes, the use of light reinforcing cords or a small number of plies of reinforcing cords renders the separating partitions more flexible with a resulting increase in the cushioning quality of the tire and reduction in strains due to deflection. The flexibility of the separating partition is also increased by the fact that the sidewalls of the tubes are quite close together for a substantial height thereof, thereby providing comparatively long, thin, flexible partitions of substantially uniform thickness.

Another feature of the present invention is the use of a more extensible rubber composition for the filler material between the tubes and the tread than that used between the tubes and the base, thereby giving a more flexible tire which may easily bend when used as a track for track laying vehicles.

Other objects and advantages of the present invention will become apparent from the following description when read in conjunction with the accompanying drawings, wherein.

Figure 1:
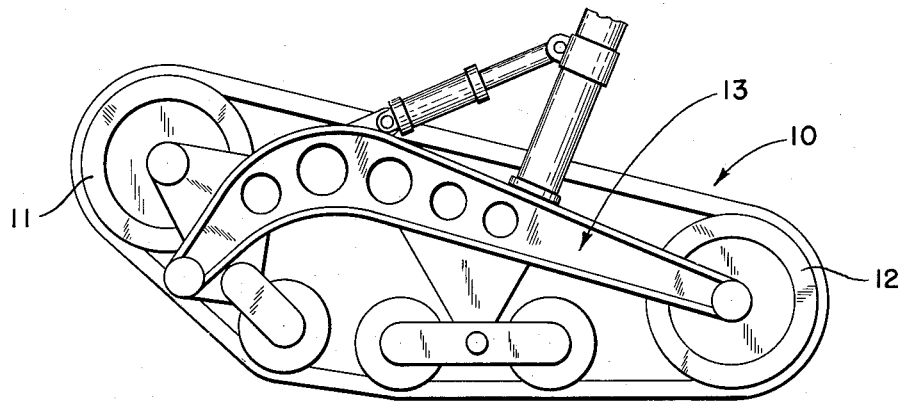
Fig. 1 is an elevational view of a track type airplane landing gear showing the pneumatic tire of the present invention installed thereon.

Referring to the drawings and in particular to Fig. 1 of the drawings, there is shown a typical installation of the pneumatic tire of the present invention. The tire generally designated by the reference numeral 10, is shown trained around spaced wheels 11 and 12 of a track airplane landing gear, generally designated by the reference numeral 13. The landing gear 13 forms no part of the present invention and is merely shown to illustrate a typical installation of the pneumatic tire of the present invention. While the tire is shown being used as a track, it is to be understood that it can be used as a wheel tire in the conventional manner.

Figure 2:
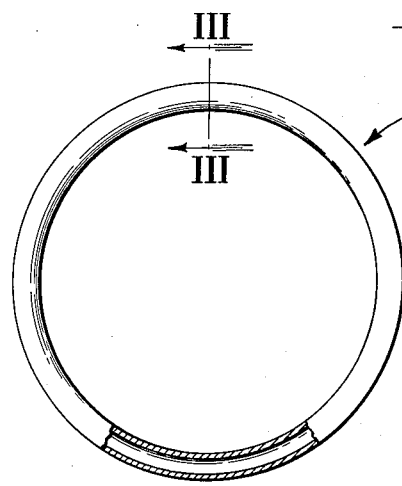
Fig. 2 is an elevational view, partly in section, of an unmounted tire made according to the present invention.
Figure 3:
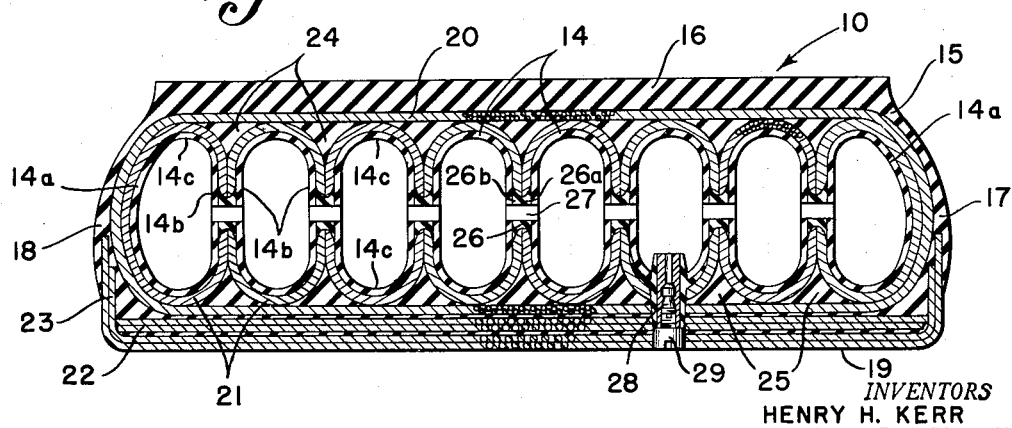
Fig. 3 is a sectional view taken on the line III—III of Fig. 2 showing details of the construction of the tire.

As shown in Fig. 2, the unmounted tire is in the form of an endless belt of generally annular shape. Referring to Fig. 3, the tire 10 includes a number of longitudinally extending, endless, inflatable, elastic rubber tubes 14 and 14a positioned in side-by-side parallel relationship. The tubes adjacent the sides of the tires are designated by the reference numeral 14a and the intermediate tubes are designated by the reference numeral 14. In Fig. 3, eight tubes are shown but it is to be understood that a greater or lesser number of tubes could be used as desired. The term "rubber" is used above and hereafter in its generic sense to include natural or synthetic rubber and plastic materials exhibiting rubber-like properties or blends thereof.

An elastic rubber covering generally designated by the reference numeral 15, surrounds the tubes 14 and 14a and provides a tread portion 16, side wall portions 17 and 18 and a base portion 19. Two plies of substantially inextensible, flexible, reinforcing fabric 20 extend around the tubes 14 and 14a as a group and two plies of substantially inextensible, flexible, reinforcing fabric 21 extend around the individual tubes 14 and 14a. Two plies of substantially inextensible, flexible, reinforcing fabric 22 are embedded in the base portion 19 of the cover 15 to render the base portion 19 substantially inextensible longitudinally and two chafing strips 23 extend along the base portion 19 and part of the way up each of the sidewall portions 17 and 18. The chafing strips 23 restrain the base of the tire against transverse expansion or growth. Both strips 23 may be of a woven textile fabric but it may be desirable to use a metallic wire cord fabric laid at 90° to the longitudinal axis of the tire as one of the chafer strips to thereby further minimize transverse growth of the base. Reinforcing fabrics 20, 21 and 22 may be either metal or textile and if textile may be either natural or synthetic. The fabrics 20, 21 and 22 are coated with rubber as is conventional practice to increase the adhesion thereof with the other components of the tire. If the tire 10 is to be used as a track for a track laying vehicle, the individual cords of the reinforcing fabrics 20 and 21 may be laid at an angle of approximately 90° to the longitudinal axis of the tire as described in co-pending application Serial No. 341,084, filed March 9, 1953, by Ernst Eger, and assigned to the same assignee as the instant application. If the tire is to be used in the conventional manner as a wheel tire, the reinforcing fabrics 20 and 21 may be bias-laid at approximately 45° as is conventional tire construction practice. Rubber filler strips 24 occupy the spaces between the tubes 14 and 14a and the tread portion 16 of the cover 15 and rubber filler strips 25 occupy the spaces between the tubes 14 and 14a and the base portion 19 of the cover 15. Filler strips 24 and 25 serve to position the tubes 14 and 14a within the cover 15.

Flanged rubber grommets 26 bonded at each end to adjacent tubes 14 and 14a provide passageways 27 interconnecting the adjacent tubes 14 and 14a so that all tubes may be inflated from a single valve 28 carried by one of the tubes. Instead of providing grommets 26 between all the tubes 14 and 14a, grommets may be provided between two or more tubes and a separate inflating valve provided for each group of tubes so grommeted together. The advantage of this structure would be that the tire would be divided into several independent pneumatic chambers so that the tire could be used for temporary operation with one or more of the chambers deflated. To facilitate application of the grommets 26 to the tubes 14 and 14a, the grommets 26 may be made in two halves as indicated by the reference numerals 26a and 26b in Fig. 3. This permits the individual halves 26a and 26b to be applied to the tubes 14 and 14a before the tubes are assembled together to form the tire. In fabricating the tire, the tubes 14 and 14a with the grommet halves 26a and 26b adhered thereto are placed in parallel, side-by-side relationship with the grommet halves 26a and 26b in alignment and the two grommet halves are then bonded together. Valve 28 extends through the base portion 19 and the end thereof is recessed so that a cap 29 when screwed thereon does not extend beyond the outer surface of the base portion 19. Tubes 14 and 14a, reinforcing fabrics 20, 21 and 22, chafing strips 23 and filler strips 24 and 25 are bonded together by vulcanization to form an integral unit.

It will be noted that the tubes 14 and 14a are of an oblong shape of substantially greater height than width in cross section and have straight wall sections 14b and semi-circular ends 14c. When the tubes 14 and 14a are inflated, the greatest forces are, therefore, exerted in a transverse direction with respect to the tire as the greatest area on which the pressure acts is contained in the straight sidewalls 14b of the tubes 14 and 14a rather than the semi-circular ends 14c. When inflated, the tubes 14 and 14a tend to blow to a round shape of maximum volume but are restrained against transverse expansion by the plies of reinforcing fabric 20. The reaction forces exerted between the tubes 10 from the restraining action of the plies of reinforcing fabric 20 presses the sidewalls 14b of adjacent tubes 14 and 14a tightly together, thereby increasing the effective bond between the tubes 14 and 14a and the plies of reinforcing fabric 21. This transverse pressure exerted between the sidewalls of the adjacent tubes 14 and 14a also serves to put the grommets 26 under compression to thereby increase the effective bond between their two halves 26a and 26b and the tubes 14 and 14a.

The semi-circular ends 14c of the tubes 14 and 14a because of their initial shape as contained by filler strips do not tend to change shape upon inflation and therefore do not distort either the tread portion 16 or the base portion 19 as would be the case if the ends were made straight. The tubes 14a adjacent the sidewall portions 17 and 18 are outwardly curved on the side thereof adjacent the sidewall portions 17 and 18 so that when they are inflated they will not distort and pull the lateral edges of the tread portion 16 downwardly.

The plies of reinforcing fabric 21 which surround the individual tubes serve to tie the tread portion 16 to the base portion 19 and thereby control the height of the tire. As a large part of the load due to inflation is taken by the reinforcing fabric 20, the reinforcing fabric 21 surrounding the individual tubes may be lighter or less plies may be used than would be the case if they had to take the full load. The cushioning and riding quality of the tires is largely dependent on the flexibility of the vertical partitions formed by the walls of the adjacent tubes 14 and 14a and the reinforcing fabric 21 surrounding the individual tubes. The fact that lighter or less plies of reinforcing fabric may be used around the individual tubes 14 and 14a increases the flexibility of the separating partitions. In addition, by using an oblong-shaped tube 14 the partitions are quite narrow for substantially the full height thereof and are therefore quite flexible. Further, the separating partitions are of substantially the same thickness for substantially the entire height thereof with the result that the flexing of the vertical separating partitions is distributed over the full height thereof and is not concentrated at one point as would be the case were the tubes circular instead of oblong in shape.

It should also be noted that the oblong-shaped tubes 14 occupy almost all the space within the substantially rectangular cover 15 and comparatively small filler strips 24 and 25 may be used so that heat build-up and power consumption are reduced.

Another feature of the invention is the use of different rubber compositions for the filler strips 24 adjacent the tread portion 16 and the filler strips 25 adjacent the base portion 19. The filler strips 24 are made of a readily extensible rubber stock composed of approximately 20 parts of carbon black to 100 parts of rubber and the filler strips 25 adjacent the base portion 19 are made of a less extensible rubber composition of approximately 50 parts of carbon black per 100 parts of rubber. In this manner, the portion of the tire 10 more remote from the base 19 is rendered more flexible so that when the tire is used as a track, the tire may easily bend in passing around the spaced wheels of the vehicle upon which it is used. The use of the less extensible stock in the base portions strengthens the tire in this region and assists in preventing longitudinal stretching of the tire so that it will tightly grip the wheels on which it is used.

Figure 4:
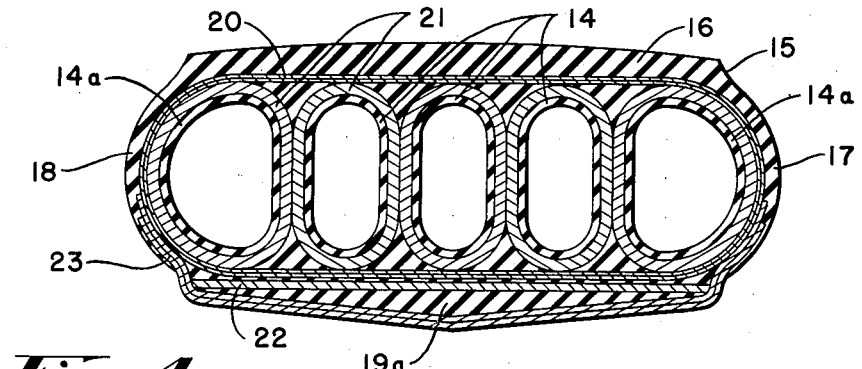
Fig. 4 is a sectional view of a slightly modified form of the tire of the invention having a tapered base adapted to be used on a wheel having a tapered rim.

Referring to Fig. 4, there is shown a modification of the tire of the present invention. This modification is identical to the tire shown in Fig. 3 except that only five tubes 14 and 14a are used and the base portion 19a is tapered from each lateral edge thereof to a maximum thickness at the center of the base so that the tire may be used on a wheel having a correspondingly tapered rim. The tire of Fig. 4 otherwise functions in the same manner described in conjunction with the tire of Fig. 3. The sectional view of Fig. 4 was taken at a point spaced from the interconnecting grommets and inflating valve of the tire and accordingly these elements do not show in this figure.

Figure 5:
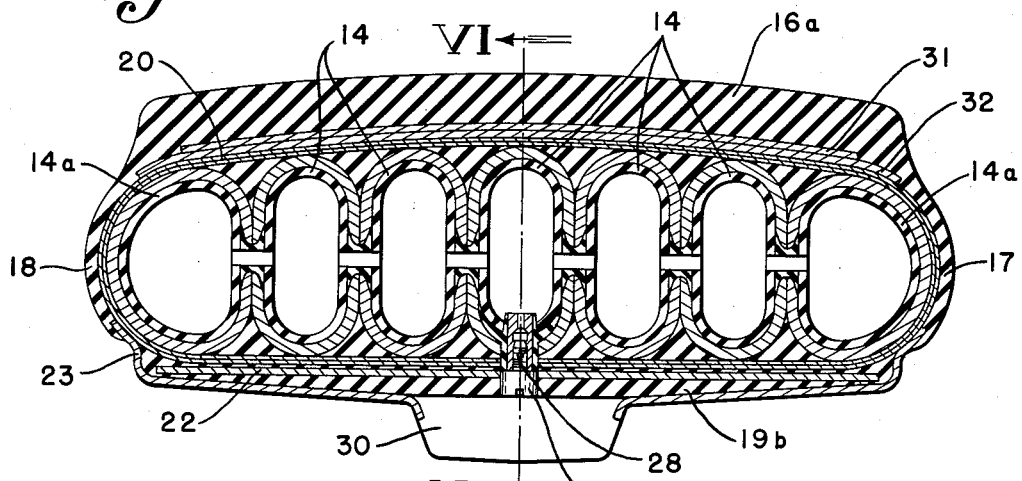
Fig. 5 is a sectional view of another modification of the present invention in which integral driving lugs are provided on the base of the tire.
Figure 6:
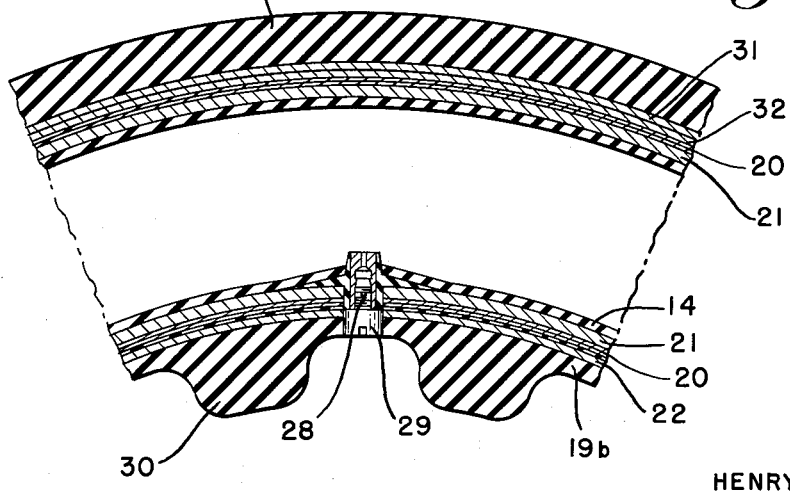
Fig. 6 is a sectional view taken on the line VI—VI of Fig. 5.

Referring to Figs. 5 and 6 there is shown another modification in which the tubes 14 are increased in height from the lateral edges of the tire to the center of the tire to give a curved crowned tread 16a. The crowned tread 16a is particularly useful when the tire is used for a wheel tire. Integral rubber driving lugs 30 are formed on the base portion 19b. The lugs 30 are adapted to be engaged in corresponding recesses of the rim of the wheel upon which the tire is to be used. The lugs 30 are particularly useful when the tire is to be used on a driving wheel as they prevent slippage between the rim of the wheel and the tire. Two breaker plies 31 and 32 of substantially inextensible transversely extending reinforcing cords provided in the tread portion 16a give additional reinforcement against transverse expansion and therefore serve to control the width of the tire. The breaker plies 31 and 32 also serve to resist ruptures and improve tread adhesion.

Figure 7:
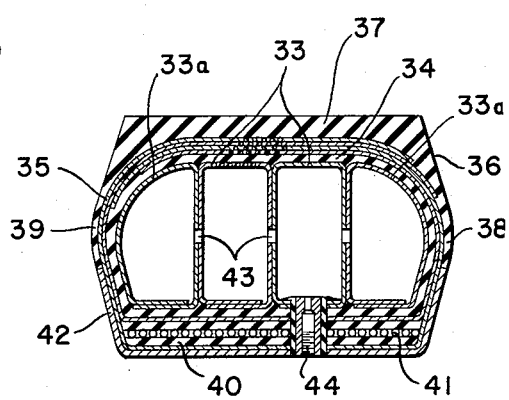
Fig. 7 is a sectional view of still another modification of the present invention.

Referring to Fig. 7 there is shown still another modification of the tire of the present invention. In this modification the rubber tubes 14 and 14a of Fig. 3 are eliminated and the tubular air chambers are formed by fabric tubes 33 and 33a. The tubes 33 and 33a are bonded together in side-by-side parallel relationship and serve the same function as the plies of reinforcing fabric 21 in the embodiment of Fig. 3. A layer of rubber 34 is bonded to and surrounds the tubes 33 and 33a as a group and two plies of reinforcing fabric 35 surround the tubes 33 and 33a and the layer of rubber 34. Reinforcing fabric 35 serves the same function as the reinforcing fabric 20 of Fig. 3. A rubber cover 36 surrounds the tubes 33 and 33a, rubber layer 34 and reinforcing fabric 35 and provides a tread portion 37, sidewall portions 38 and 39 and a base portion 40. A layer of substantially longitudinally inextensible reinforcing cords 41 is provided in the base portion 40. A fabric chafing strip 42 extends under the base portion 40 and partly up the sidewalls 38 and 39. Tubes 33 and 33a, rubber layer 34, reinforcing fabric 35, reinforcing fabric 41, chafing strip 42 and rubber cover 36 are bonded together to form an integral unit.

Interconnecting ports 43 are provided between the tubes 33 and 33a so that all the tubes 33 and 33a may be inflated from a single valve 44 which is secured to one of the tubes 33 and extends through the base portion 40.

It will be noted that the tubes 33 and 33a are of substantially rectangular cross section with the height thereof substantially greater than the width. When the tubes 33 and 33a are inflated, the greatest forces are, therefore, exerted in a transverse direction with respect to the tire as the greatest area on which the pressure acts is contained in the sidewalls of the tubes 33 and 33a rather than their ends. The tubes 33 and 33a, however, are restrained against transverse expansion by the reinforcing fabric 35 and the reactions to the transverse forces press the sidewalls of the adjacent tubes 33 and 33a tightly together and thereby increase the effective bond therebetween. Because the reinforcing fabric 35 takes the greater portion of the load due to inflation, the fabric tubes 33 and 33a may be of substantially lighter weight fabric than if they had to take the full load. Accordingly the separating partitions formed by the adjacent sidewalls of the tubes 33 and 33a are quite flexible thereby giving the tire good cushioning properties.

The tubes 33a adjacent the sidewall portions 38 and 39 are outwardly curved on the side thereof adjacent the sidewall portions 38 and 39 so that when they are inflated they will not distort and pull the lateral edges of the tread portion 37 downwardly.

From the above description it can be seen that there is provided a novel construction for a tire of the type incorporating a plurality of longitudinally extending tubular air chambers. The novel shape of the chambers permits the utilization of the inflation pressure to increase the bond between adjacent tubes and the reinforcing fabrics surrounding the tubes and to increase the bond and air seal between the interconnecting grommets of the tubes when such are used. The novel shape of the chambers also enhances the riding qualities of the tire by permitting a construction in which the separating partitions are long and thin and therefore quite flexible. The use of a more extensible rubber stock for the filler strips adjacent the tread portion of the tire and the use of a less extensible rubber stock for the filler strips adjacent the base portion of the tire renders the tire more flexible so that when the tire is used as a track, the tire may easily bend in passing around the spaced wheels of the vehicle upon which it is used.

It is to be understood that the above description and accompanying drawings are for the purpose of illustration only and not by way of limitation and changes and modifications may be made therein without departing from the spirit and the scope of the invention.

Having thus described our invention, what we claim and desire to protect by Letters Patent is:

1. A pneumatic tire comprising, a plurality of longitudinally extending, extensible, endless, flexible tubes bonded together in side-by-side parallel relationship, the height of each tube in cross section being substantially greater than the width thereof but substantially less than the overall width of the tire to thereby provide a tire having substantially greater overall width than height, substantially inextensible reinforcing elements surrounding the tubes as a group to restrain the tubes against transverse expansion, a rubber cover providing tread, sidewall, and base portions bonded to and surrounding said tubes and reinforcing elements, substantially inextensible reinforcing elements in said base portion, rubber grommets bonded to and extending between at least two adjacent tubes, said grommets providing interconnecting passageways between said adjacent tubes whereby said adjacent tubes may be inflated by introduction of fluid into one of said adjacent tubes, and means for introducing fluid under pressure into said tubes.

2. A pneumatic tire comprising, a plurality of longitudinally extending, extensible, endless, flexible, rubber tubes positioned in side-by-side parallel relationship, the height of each tube in cross section being substantially greater than the width thereof but substantially less than the overall width of the tire to thereby provide a tire having substantially greater overall width than height, substantially inextensible reinforcing elements surrounding each of the individual tubes, substantially inextensible reinforcing elements surrounding said tubes as a group to restrain the tubes against transverse expansion, a rubber cover providing tread, sidewall and base portions surrounding said tubes and reinforcing elements, substantially inextensible reinforcing elements in said base portion, said tubes, reinforcing elements and cover being bonded together to form an integral unit, rubber grommets bonded to and extended between at least two adjacent tubes, said grommets providing interconnecting passageways between said adjacent tubes whereby said adjacent tubes may be inflated by introduction of fluid under pressure into one of said adjacent tubes, and means for introducing fluid under pressure into said tubes.

3. A pneumatic tire comprising, a plurality of longitudinally extending, endless, flexible, rubber tubes positioned in side-by-side parallel relationship, the height of each tube in cross section being substantially greater than the width thereof but substantially less than the overall width of the tire to thereby provide a tire having substantially greater overall width than height, substantially inextensible reinforcing elements surrounding each of the individual tubes, substantially inextensible reinforcing elements surrounding said tubes as a group to restrain the tubes against transverse expansion, a rubber cover providing tread, sidewall and base portions surrounding said tubes and reinforcing elements, rubber filler strips occupying spaces between said tubes and said tread and base portions, the filler strips between the tubes and the tread portion being of an extensible rubber composition of approximately 20 parts of carbon black per 100 parts of rubber, the filler strips between the tubes and the base portion being of a less extensible rubber composition of approximately 50 parts of carbon black per 100 parts of rubber, substantially inextensible reinforcing elements in the base portion, said tubes, filler strips, reinforcing elements, and cover being bonded together to form an integral unit, rubber grommets bonded to and extended between at least two adjacent tubes, said grommets providing interconnecting passageways between said adjacent tubes whereby said adjacent tubes may be inflated by introduction of fluid into one of said adjacent tubes, and means for introducing fluid under pressure into said tubes.

4. A pneumatic tire comprising, a plurality of longitudinally extending, endless, flexible, rubber tubes positioned in side-by-side parallel relationship, the height of each tube in cross section being substantially greater than the width thereof but less than the overall width of the tire to thereby provide a tire having an overall width substantially greater than the height thereof, the adjacent sidewalls of said tubes being substantially straight, substantially inextensible reinforcing elements surrounding each of said individual tubes, substantially inextensible reinforcing elements surrounding said tubes as a group for restraining said tubes against transverse expansion, a rubber cover providing tread, sidewall and base portions surrounding said tubes and reinforcing elements, substantially inextensible reinforcing elements in the base portion, said tubes, said reinforcing elements, and cover being bonded together to form an integral unit, grommets bonded to and extending between at least two adjacent tubes, said grommets providing interconnecting passageways between said adjacent tubes whereby said adjacent tubes may be inflated by introduction of fluid into one of said adjacent tubes, and means for introducing fluid under pressure into said tubes.

References Cited in the file of this patent

UNITED STATES PATENTS

| | | |
|---|---|---|
| 1,232,100 | Schultz | July 3, 1917 |
| 1,679,444 | Pagenhart | Aug. 7, 1928 |
| 1,976,235 | Lawrence | Oct. 9, 1934 |
| 1,979,947 | Krauch et al. | Nov. 6, 1934 |
| 2,193,481 | Fawick | Mar. 12, 1940 |
| 2,277,145 | Pierce | Mar. 24, 1942 |
| 2,441,945 | Frolich et al. | May 25, 1948 |
| 2,445,725 | Walker | July 20, 1948 |
| 2,664,935 | Des Rosiers | Jan. 5, 1954 |